July 20, 1965   K. E. NELSON ETAL   3,195,562
PRESSURE AIR LINE WITH VALVED TAKE-OFF STATIONS
Filed June 4, 1962   2 Sheets-Sheet 1

Inventors
Knut Edward Nelson
Carl Thierfeldt
By Richmond A. Hayes
Attorney

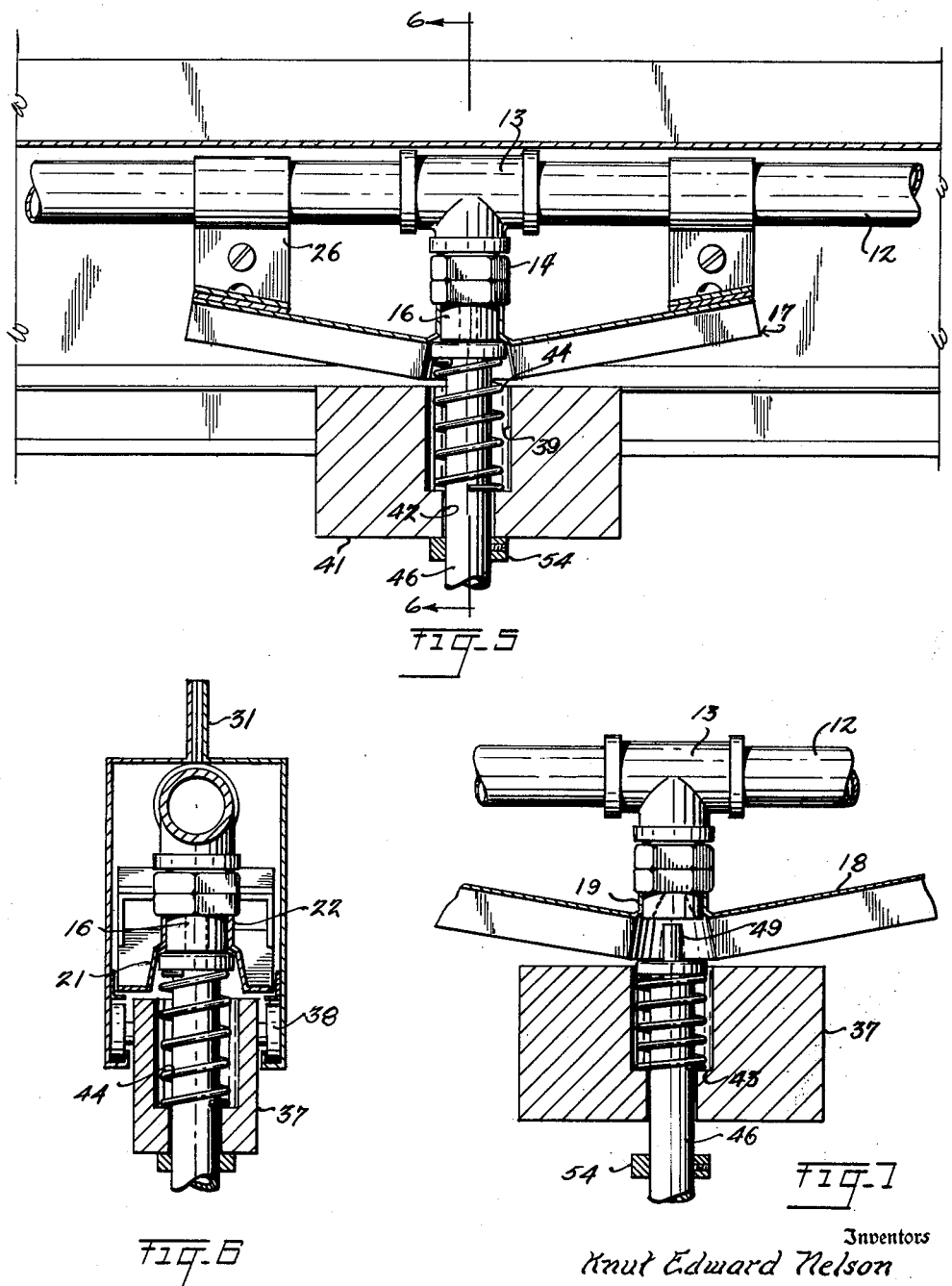

United States Patent Office 3,195,562
Patented July 20, 1965

3,195,562
PRESSURE AIR LINE WITH VALVED
TAKE-OFF STATIONS
Knut Edward Nelson, Jamestown, and Carl Thierfeldt, Frewsburg, N.Y., assignors to Dahlstrom Manufacturing Corp., Jamestown, N.Y., a corporation of New York
Filed June 4, 1962, Ser. No. 199,922
4 Claims. (Cl. 137—322)

This invention relates to an improved mechanism and means for making fluid, under pressure, available at any of a number of stops or stations. To more clearly illustrate the invention, it is particularly shown and described in connection with a pipe line containing air under pressure, together with means by which a given lead off hose and attached tool may, at will, be operatively joined to any selected station in an area serviced by the line.

Heretofore, and particularly with reference to pipe lines containing air under pressure, it has been the practice to arrange the lines along the building walls of a given work area. Such lines were located above benches and within reach of a worker and enabled him to plug into the line at predetermined outlet valves. Frequently, due to assembly arrangements, a worker was required to use his air tool at some distance from the plug in source. This, of course, meant that many feet of hose generally rested on the floor, necessitating it being dragged therefrom to a place of use of the tool. This became an accident hazard to workers moving about in the area, to say nothing of inconvenience to an operator, and the general deterioration and repeated breakage of hose lines. It is mentioned that the only circumstances under which wall carried air lines are found practical occurs in narrow, elongated work areas wherein the working assembly, through the use of air tools, is close to such a wall.

Many work areas, wherein fabrication requires air tools, are of such proportions and height that the heretofore conventional air supply lines are inadequate, both as to work requirements and convenience. For example, currently erected building areas are of considerable height to enable less costly contruction and simultaneously provide overhead space for production line conveyors, hoists, etc. Under such conditions, the provision of wall mounted air lines, with their remote and inconveniently located wall outlets, would be impracticable from almost any standpoint.

The present invention, as herein shown and described, is directed to the provision of means by which a useful air operated tool may be easily and readily connected with an air line system at any of a multiplicity of connector stations, despite the fact that the system is well above and out of the way of a work area. It will, of course, be apparent that the invention may equally find use in the conveyance and station distribution of fluids other than air, such, for example, as gases or liquids required in other phases of manufacture and assembly.

It is an object of the invention to provide an air pressure line system wherein a series of conveneintly located air release stops or stations are established with which coupling may be had by an operator's tool connected hose.

Another object of the invention resides in the structure by which a hose motivated trolley may pass from one air release station to another solely by means of operator handling and without special control devices.

Another and important object of the invention may be readily found in the fact that an operator handling the tool connected hose may, at will, not only move it from one station to another, but may also by-pass one or more stations in order to make the tool available for use at the place nearest a given work area.

Still another object of the invention lies in the provision of an air pressure line system which, due to overhead mounting, is completely removed and out of the way of operations in any given work area.

And a further object of the invention lies in the provision of track and guide structure for a hose connected trolley which enables self-locking of the trolley nozzle at any selected air outlet station.

Other objects and advantages of the invention will be more fully disclosed from a consideration of the following specification, taken in conjunction with the accompanying drawings; and in which—

FIG. 5 is an enlarged, partly sectional view, similar to FIG. 2, with the exception that the trolley nozzle is in air take-off position;

FIG. 6 is a vertical sectional view, taken substantially on the line 6—6 of FIG. 5; and FIG. 7 shows the trolley nozzle released from air engagement with a station preparatory to moving the trolley to another station.

Figures 2, 3:
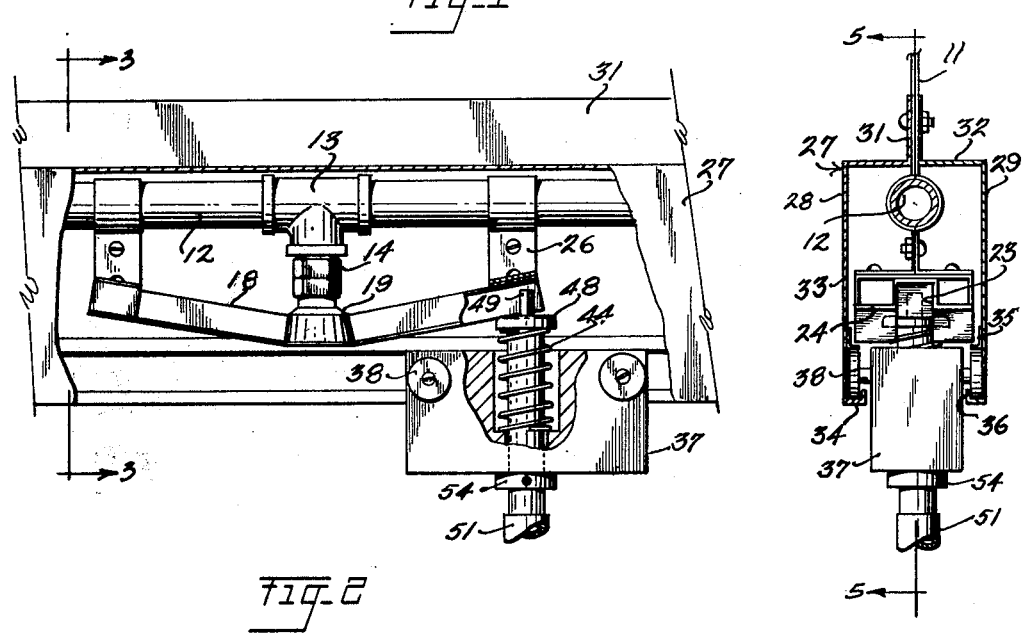
FIG. 2 is an enlarged elevational view of a portion of the structure of FIG. 1 and shows one of the stations at which air may be tapped, together with a trolley for making station connection.
FIG. 3 is a vertical view, partly in section, being taken substantially on the line 3—3 of FIG. 2.
Figure 4:
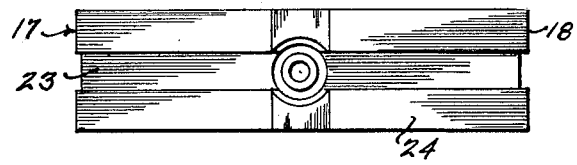
FIG. 4 is an enlarged bottom plan view of one of the stations, being taken substantially as suggested by the line 4—4 of FIG. 1.

Referring more particularly to the drawings, the reference numeral 10 is employed to designate an overhead beam or similar horizontal portion of roof bracing commonly found in present factory buildings. It will be kept in mind that such bracing in modern buildings is at a considerable height from the building floor, thus leaving an ample overhead area unincumbered by close overhead cables, conduits, etc. Suitable spaced hangers 11 are attached to and depend from the beams 10. These hangers provide a wrap-around sling for an air pressure pipe 12. The pipe, of course, follows a pattern about a given work area in accordance with the planned progression or steps for fabrication. At predetermined intervals, the pipe 12 is fitted with air release stations, designated at 13. Each station includes a neck 14 which contains a conventional spring seated valve unit, generally indicated at 16. The valve entrance wall may be funnel shaped to accurately locate a valve actuator, as hereinafter described. Each of the stations 13 is provided with a guide device 17 which takes the form of identical channel parts 18 that incline downwardly toward each other and become integral with a collar 19. This collar (see FIGS. 5 and 6) extends upwardly, having opposed semi-circular, inwardly inclined walls 21 that join to form a circular neck-line flange 22 which encloses the lower end of the valve unit 16. The interior wall of the collar 19 greatly assists as means for centering a valve actuator with the unit 16. The inclined parts 18, as suggested in FIG. 3, provide a downwardly opening channel 23, having marginal flanges 24 which continue upwardly and inwardly, in box-like form, to provide rigidity. The free ends of the parts 18 are secured to the pipe 12 by straps 26, and these straps, together with the fit of the guide on neck 14, render the device 12 entirely rigid with respect to the pipe 12.

An enclosure 27 is provided for the pipe 12 and stations 13 and consists, in cross section (see FIGS. 3 and 6), of a two-part box-like structure. The two parts 28 and 29 of this structure are identical and reversed, each consisting of an upstanding flange 31, horizontal flange 32, vertical flange 33, and inturned flange or rail 34. Each rail 34 has an inner guard-like flange 36. Attached to the inner faces of flanges 33 are angle bars 35 which cooperate with the flanges 36 to confine the rollers of the trolley to the rail 34.

Attention is now particularly directed to the trolley 37 from which is suspended an air line and pneumatic tool. This trolley is a relatively heavy and substantial member that is fitted on opposite sides with fore and aft rollers 38, preferably adjacent the trolley top. The trolley is of a width to freely move between the rail guards 36 and in large part projects downwardly beneath the enclosure 27 when the rollers 38 are engaged with the rails 34. Centrally, the trolley has a vertically located opening 39 which continues through the trolley bottom 41 via a reduced diametered opening 42. The annular shoulder 43 thus formed provides a seat for the lower end of a compression spring 44. A metal tube 46 projects through the connected openings 41 and 39 and, at its upper end, is fitted with a nipple 47 which, by way of a rim 48, is adapted to rest on the upper end of spring 44. An entrance tube 49 completes the nipple structure and is of a length approximately as shown in the drawings. The other end of the tube 46 is joined, as at 51, to one end of a flexible hose 52. It will be understood that the tube 46 may be drawn downwardly of the trolley 41 and that such action will compress the spring 44 (see FIG. 7). The extent to which the expanding action of this spring may raise or extend the nipple 47 above the trolley is determined by a lock-ring 54. From the foregoing, it is evident that an operator may pull downwardly on the hose 52 and thereby partially withdraw the nipple 47 into the upper opening 39 of the trolley under tension of the spring 44 and, as will be appreciated from the following explanation of operation, these structural details are of importance to the successful and satisfactory functioning of the present invention.

Figure 1:
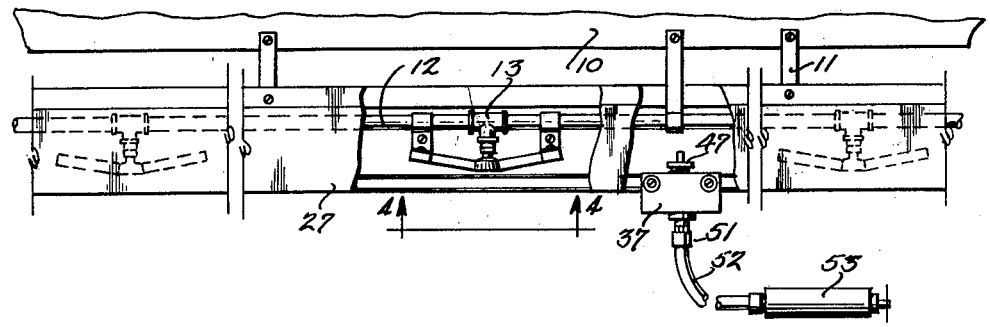
FIG. 1 is a fragmentary elevational view of an air pressure line combined with a track and trolley embodying one form of the invention, certain parts being broken away to disclose the relationship of various structural elements.

For a clearer understanding of the usefulness and structure of the present invention, it may be assumed that the air line 12 is suitably attached to structure above a given work area and follows a pattern about said area best suited to progressive production or assembly. It may also be assumed that the pipe 12, at multiple intervals, is provided with air release or take-off stations, such as designated at 13 in the drawings. As has been described, there is an enclosure for the pipe 12 which also provides a trackway for the trolley 37. At the beginning or end of this overhead suspended structure, one or more trolleys 37 may, through their rollers 38, be mounted on the rails 34 with the connecting flexible hose 52 and suitable tool 53 extending downwardly into the work area. As has been stated, the trolley 37, being of substantial proportions and mounted on anti-friction rollers, is readily movable along the rails 34 by merely pulling the hose 52 in the general direction of the enclosure 27 and pipe 12. This generally horizontal pull on hose 52 does not withdraw the nipple 47 into the trolley against the tension of spring 44 and, the trolley, as shown in FIGS. 1 and 2, will move toward a station, the parts being substantially as shown.

The guide device 17, located at each station 13 by way of its channel 23, readily receives the tube 49 of the nipple without contacting the same. However, the rim 48 is of such diameter that it contacts the channel flanges 24 and, since the channel parts are downwardly inclined, the trolley 37, as moved into proximity with any given station 13, causes the nipple 47 to be depressed against tension of spring 44. When the trolley has approximately centered with the station guide device, the opening formed at the juncture of the parts 18 permits the spring 44 to immediately jockey the nipple into the collar 19. It will, of course, be understood that the tension of springs 44 is sufficiently greater than the tension of springs provided for the valves at each station so that the nipple 47 will be caused to move upwardly, projecting the entrance tube 49 into the station valve, and thus tapping the compressed air line 12 to make this air available at the tool 53.

Obviously, in the use of such tools, it will frequently occur that one station next adjacent to another may not be the one most convenient for an operator, or, in fact, most convenient in the fabrication of one article with respect to another. Under such circumstance, the operator will not only pull the hose 52 in a horizontal direction as the trolley 37 approaches a station 13, but will also pull downwardly on the hose, thus withdrawing the nipple into the position shown in FIG. 7. In this manner, the trolley 37 may be moved past one or more stations without the necessity of connection therewith, and at such time as the desired station is reached, the operator need only release the downward pull on hose 52 to effect connection with the pipe 12 in the manner already described. From the above, it will be understood that the present invention makes possible the selective connection of compressed air operated tools with any station provided in a given compressed air line system. Furthermore, the trolley 37 may be moved forwardly or backwardly along the rails 34, and it is immaterial if the operator passes a desired station, because he can merely move the trolley in the opposite direction, release his downward pull, and connection with the pipe 12 will be automatically and instantly established at the next station.

Although applicants have shown and described only one form of their invention, it will be apparent that the general design system and arrangement of parts may be modified not only for more or less extensive air pressure systems, but for other fluids under pressure as well, and any such variations or modifications are therefore considered as being within the spirit and scope of the invention insofar as they are encompassed by the annexed claims.

Having thus set forth our invention, what we claim as new and for which we desire protection by Letters Patent is:

1. In a system for the dispensing of fluid under pressure to a given work area including an overhead fluid containing pipe line having a plurality of spaced outlet valves and a track depending from said pipe line and conforming to the arrangement of said system; and air delivery structure comprising a trolley movable along said track, a flexible hose for connecting said trolley with a tool operable by the fluid in said line, spring actuated fluid take-off means on said trolley including a rimmed nipple projecting thereabove, fixed pairs of guide channels directly above said track converging to form vertical, walled openings aligned with said outlet valves, either of said channels being engageable by the rim of said nipple when said trolley is moved along said track whereby to spring depress said take-off means preparatory to registering with one of said openings.

2. In an overhead pressure air line having a series of takeoff stations defined by valves and a track located directly beneath and paralleling said line, air delivery structure comprising a trolley mounted on and freely movable along said track, a spring actuated hollow nipple in said trolley, a flexible hose depending from said trolley for connecting said nipple with an air tool, and means attached to each of said valves operable to sequentially depress said nipple against tension of the spring and automatically center it for registering with one of said valves when said trolley is moved into the vicinity of any one of said valves.

3. In an overhead pressure air line having a series of take-off stations defined by valves and a track located directly beneath and paralleling said line, air delivery structure comprising a trolley mounted on and freely movable along said track, a spring actuated hollow nipple in said trolley, a flexible hose depending from said trolley for connecting said nipple with an air tool, a collar enclosing each of said valves, a pair of guide channels integral with and inclining upwardly away from said collar and in a direction common to that of said track, any of said channels serving to engage and depress said nipple against tension of said spring when said trolley is moved into proximity with a valve, said collar serving to accurately and automatically align said nipple for registering with a valve whereby the spring action will couple said nipple with said line and make air pressure available at a tool.

4. In an overhead pressure air line system having a series of take-off stations defined by valves and a track located directly beneath and paralleling the line of said system, an air delivery structure for selectively connecting an air tool with said valves in a remote manner consisting of a trolley mounted on and freely movable along said track, a flexible hose depending from said trolley for connection with an air tool, said hose serving as a means by which a worker may move said trolley along said track, converging guide channels located above and paralleling said track at each of said valves, a spring actuated nipple attached to that end of said hose within said trolley, said nipple being depressed by engagement with any one of said channels whereby, when said nipple registers with any one of said valves, the spring action couples the nipple with the valve for making air pressure available at a tool.

References Cited by the Examiner
UNITED STATES PATENTS

| | | | |
|---|---|---|---|
| 951,519 | 3/10 | Bacigalupi | 137—322 |
| 1,008,004 | 11/11 | Bacigalupi | 137—322 |
| 2,720,217 | 10/55 | Vossbrinck | 137—561 |
| 2,831,501 | 4/58 | Gummere | 137—561 |
| 2,926,689 | 3/60 | Berry | 137—322 |

ISADOR WEIL, *Primary Examiner.*